United States Patent [19]

Kuriyama et al.

[11] Patent Number: 4,818,804
[45] Date of Patent: Apr. 4, 1989

[54] POLYCONDENSABLE MACROMONOMER FROM VINYL MONOMER AND MERCAPTO COMPOUND

[75] Inventors: Akira Kuriyama, Higashi-Osaka; Mikiko Yamaguchi, Kyoto, both of Japan

[73] Assignee: Sunstar Giken Kabushiki Kaisha, Osaka, Japan

[21] Appl. No.: 90,442

[22] Filed: Aug. 28, 1987

[30] Foreign Application Priority Data

Sep. 4, 1986 [JP] Japan ................................ 61-208949
Sep. 5, 1986 [JP] Japan ................................ 61-209305

[51] Int. Cl.[4] .................... C08F 222/02; C08F 228/02
[52] U.S. Cl. .................................. 526/211; 526/214; 526/224; 528/376
[58] Field of Search ................ 526/211, 214, 224; 528/376

[56] References Cited

FOREIGN PATENT DOCUMENTS 1126104 6/1986 Japan .................................. 526/211

Primary Examiner—Harold D. Anderson
Attorney, Agent, or Firm—Wegner & Bretschneider

[57] ABSTRACT

A novel polycondensable macaronmonomer of the formula:

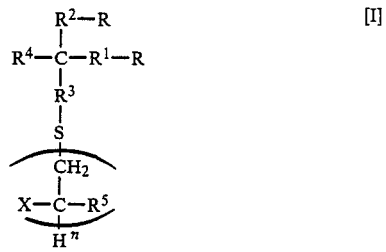

wherein R is OH or COOH, $R^1$, $R^2$ and $R^3$ are the same or different and are each a single bond or an alkylene having 1 to 4 carbon atoms, $R^4$ is hydrogen atom or an alkyl having 1 to 4 carbon atoms, $R^5$ is hydrogen atom or methyl, X is an alkyloxycarbonyl having 2 to 15 carbon atoms, a sustituted alkyloxycarbonyl having 2 to 15 carbon atoms in the alkyloxycarbonyl moiety, a cycloalkyloxycarbonyl having 3 to 7 carbon atoms in the cycloalkyl moiety, or phenyl, and n is an integer of from 1 to $1 \times 10^4$, which is useful as an intermediate for the prodcution of a polymer having comb-shape structure useful as an adhesive, adhesion improver, caompatibilizing agent, surfactant, etc.

5 Claims, No Drawings

POLYCONDENSABLE MACROMONOMER FROM VINYL MONOMER AND MERCAPTO COMPOUND

This invention relates to a novel polycondensable macromonomer, more particularly relates to a polycondensable macromonomer containing dihydroxy or dicarboxy groups which is an oligomer having two hydroxy or carboxy groups at the terminal of vinyl polymer chain of the following formula:

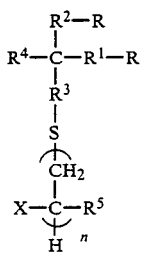

wherein R is OH or COOH, $R^1$, $R^2$ and $R^3$ are the same or different and are each a single bond or an alkylene having 1 to 4 carbon atoms, $R^4$ is hydrogen atom or an alkyl having 1 to 4 carbon atoms, $R^5$ is hydrogen atom or methyl, X is an alkyloxycarbonyl having 2 to 15 carbon atoms, a substituted alkyloxycarbonyl having 2 to 15 carbon atoms in the alkyloxycarbonyl moiety, a cycloalkyloxycarbonyl having 3 to 7 carbon atoms in the cycloalkyl moiety, or phenyl, and n is an integer of from 1 to $1\times10^4$, which is useful as an intermediate for the production of a polymer having comb-shape structure comprising a unit of a polyurethane or polyester as the main chain and a vinyl polymer as the side chain, said so-called comb-shaped polymer being useful as an adhesive, adhesion improver, compatibilizing agent, surfactant, etc.

PRIOR ART

There have recently been desired polymer materials having added value in addition to the excellent properties such as mechanical strength and heat resistance, and for such request, there have been produced various types of polymers such as graft copolymers, block copolymers, comb-shaped polymers, etc. For example, it is known to produce a graft polymer by producing an oligomer having carboxyl terminals by polymerizing methyl methacrylate in the presence of thioglycolic acid as a chain transfer agent, subjecting the oligomer to addition reaction with glycidyl methacrylate to produce a macromonomer having a polymerizable double bond at the terminal and then subjecting the macromonomer to radical copolymerization with an appropriate comonomer (cf. Journal of The Adhesion Society of Japan, Vol. 17, No. 9, pages 371-376, 1981). Although the desired graft copolymer can be produced from the above macromonomer, the reaction for the production of the macromonomer is undesirably complicated and is carried out by multi-steps, and further, the graft polymer is produced in low yield and in high cost.

SUMMARY DESCRIPTION OF THE INVENTION

The present inventors have intensively studied to obtain novel macromonomer useful as an intermediate for the production of a polymer having various functions and have found that novel polycondensable macromonomer having two hydroxy or carboxy groups at the terminal can easily be prepared by subjecting a vinyl monomer to a light polymerization using a mercapto compound having two hydroxy or carboxy groups as an initiator and chain transfer agent in low cost, and further that the novel macromonomer can give comb-shaped polymers having various functions by polycondensing the macromonomer with a diamine or dialcohol, etc.

An object of the invention is to provide a novel polycondensable macromonomer containing dihydroxy or dicarboxy groups at the terminal. Another object of the invention is to provide a macromonomer which is useful as an intermediate for the production of a comb-shaped polymer having various functions and being useful for various utilities. These and other objects and advantages of the invention will be apparent to those skilled in the art from the following description.

DETAILED DESCRIPTION OF THE INVENTION

The macromonomer of this invention has a formula [I] as mentioned hereinbefore, wherein R is OH or COOH, $R^1$, $R^2$ and $R^3$ are the same or different and are each a single bond or an alkylene having 1 to 4 carbon atoms (e.g. methyl, ethyl, n-propyl, n-butyl, etc.), $R^4$ is a hydrogen atom or an alkyl having 1 to 4 carbon atoms (e.g. methyl, ethyl, n-propyl, n-butyl, etc.), $R^5$ is hydrogen atom or methyl, X is an alkyloxycarbonyl having 2 to 15 carbon atoms (e.g. methoxycarbonyl, ethoxycarbonyl, propoxycarbonyl, n-butoxycarbonyl, isobutoxycarbonyl, amyloxycarbonyl, hexyloxycarbonyl, 2-ethylhexyloxycarbonyl, n-octyloxycarbonyl, lauryloxycarbonyl, tridecyloxycarbonyl, etc.), a substituted alkyloxycarbonyl having 2 to 15 carbon atoms in the alkyloxycarbonyl moiety (e.g. the above-mentioned alkyloxycarbonyl substituted by a substituent selected from hydroxy, an alkoxy having 1 to 2 carbon atoms, epoxy, halogen atoms such as fluorine atom, etc.), a cycloalkyloxycarbonyl having 3 to 7 carbon atoms in the cycloalkyl moiety (e.g. cyclohexyloxycarbonyl, etc.), or phenyl, and n is an integer of from 1 to $1\times10^4$, preferably 5 to $1\times10^4$.

The macromonomer [I] of the invention can be prepared by polymerizing a mercapto compound of the formula:

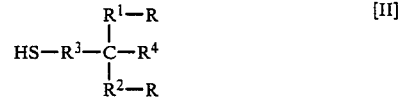

wherein R, $R^1$, $R^2$, $R^3$ and $R^4$ are the same as defined above, with a vinyl monomer of the formula:

wherein $R^5$ and X are as defined above with light irradiation.

The mercapto compound [II] includes mercaptocarboxyl compounds, such as 2-mercapto-1,3-propanedicarboxylic acid, 2-mercapto-2-methyl-1,3-propanedicarboxylic acid, 2-mercapto-2-ethyl-1,3-propanedicarboxylic acid, 2-mercapto-1,4-butanedicarboxylic acid, 2-mercapto-2-methyl-1,4-butanedicarboxylic acid, 2-mercapto-2-ethyl-1,4-butanedicarboxylic acid, 3-mercapto-3-methyl-1,5-pentanedicarboxylic acid, 3-mercapto-3-ethyl-1,5-pentanedicarboxylic acid, 3-mercaptomethyl-1,5-pentanedicarboxylic acid, 3-mercaptoethyl-1,5-pentanedicarboxylic acid, 3-mercaptomethyl-3-methyl-1,5-pentanedicarboxylic acid, 3-mercaptomethyl-3-ethyl-1,5-pentanedicarboxylic acid, 3-mercaptoethyl-3-methyl-1,5-pentanedicarboxylic acid, 3-mercaptoethyl-3-ethyl-1,5-pentanedicarboxylic acid, etc.; and mercaptohydroxy compounds, such as 1-mercapto-1,1-methanediol, 1-mercapto-1,1-ethanediol, 2-mercapto-1,2-propanediol, 2-mercapto-2-methyl-1,3-propanediol, 2-mercapto-2-ethyl-1,3-propanediol, 3-mercapto-1,2-propanediol, 1-mercapto-2,2-propanediol, 2-mercaptomethyl-1,3-propanediol, 2-mercaptoethyl-1,3-propanediol, 2-mercaptomethyl-2-methyl-1,3-propanediol, 2-mercaptomethyl-2-ethyl-1,3-propanediol, 2-mercaptoethyl-2-methyl-1,3-propanediol, 2-mercaptoethyl-2-ethyl-1,3-propanediol, etc., which may be used alone or in combination of two or more thereof. These mercapto compounds are usually used in an amount of 0.01 to 10 parts by weight, preferably 0.01 to 5 parts by weight, to 100 parts by weight of the vinyl monomer [III].

The vinyl monomer [III] includes monomers having vinyl, vinylene or vinylidene group, for example, ethyl acrylate, propyl acrylate, n-butyl acrylate, isobutyl acrylate, amyl acrylate, hexyl acrylate, 2-ethylhexyl acrylate, cyclohexyl acrylate, n-octyl acrylate, methyl acrylate, glycidyl acrylate, 2-hydroxyethyl acrylate, 2-hydroxypropyl acrylate, methyl methacrylate, ethyl methacrylate, n-butyl methacrylate, isobutyl methacrylate, 2-ethylhexyl methacrylate, lauryl methacrylate, tridecyl methacrylate, benzyl methacrylate, cyclohexyl methacrylate, tetrahydrofurfuryl methacrylate, glycidyl methacrylate, 2-methoxyethyl methacrylate, 2-ethoxyethyl methacrylate, 2,2,3,3-tetrafluoropropyl acrylate, octafluoropentyl acrylate, octafluoropentyl methacrylate, etc. and further includes 2-hydroxyethyl methacrylate, 2-hydroxypropyl methacrylate when the mercapto compound [II] is a mercaptocarboxyl compound. These vinyl monomers are used alone or in combination of two or more thereof.

Optionally, other monomers copolymerizable with the above vinyl monomer may be used. The copolymerizable monomer includes maleic anhydride, vinyl acetate, 4-META (4-methacryloxyethyltrimellitic anhydride), HEMAP (acid phosphoroxyethyl methacrylate), methacrylic acid, acrylic acid, vinyl propionate, vinyl versatate ("Veoba®", manufactured by Shell Chemical), vinyl chloride, acrylonitrile, acrylamide, N-methylolacrylamide, vinylpyridine, vinylpyrrolidone, butadiene, styrene, etc., which may be used alone or in combination of two or more thereof.

The macromonomer [I] of this invention can be prepared by the following procedure.

A prescribed amount of the mercapto compound [II] is added to the vinyl monomer [III], and the mixture is polymerized by irradiation with a light. The polymerization reaction can be carried out in a solvent such as alcohols (e.g. n-propyl alcohol, etc.), aromatic hydrocarbons (e.g. toluent, etc.), or the like (by a solution polymerization) or without using any solvent. The light polymerization has the following advantages compared with conventional heat polymerization.

(i) No radical initiator (e.g. diazo compounds, peroxides, etc.) is required.

(ii) The desired macromonomer can be obtained in a high yield.

(iii) The terminal functional groups are surely introduced.

(iv) The product can be produced in a low cost in view of the above reasons.

Thus, the macromonomer containing two hydroxy or carboxy groups at the terminal can be produced by a light polymerization.

The polycondensable macromonomer [I] of this invention is useful as an intermediate for the production of comb-shaped polymers. That is, the macromonomer [I] is polycondensed with a diamine, dialcohol, dicarboxylic acid, or diisocyanate, optionally in the presence of a polycondensation catalyst. For example, from the macromonomer [I] wherein R is COOH and a dialcohol, there is produced a comb-shaped polymer of the formula:

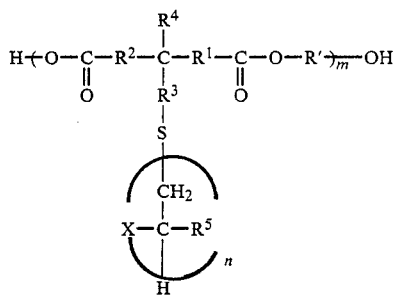

wherein —O—R'—O— is a residue of a dialcohol, m is an integer of 1 to 100, and $R^1$, $R^3$, $R^4$, $R^5$, X and n are as defined above.

In case of the polymerization of the macromonomer [I] wherein R is COOH and a diamine, there is produced a comb-shaped polymer of the formula:

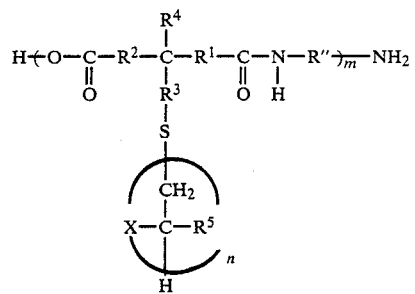

wherein

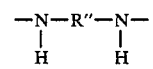

is a residue of a diamine, m is an integer of 1 to 100, and $R^1$, $R^3$, $R^4$, $R^5$, X, and n are as defined above.

In case of the polymerization of the macromonomer [I] wherein R is OH and a dicarboxylic acid, there is produced a comb-shaped polymer of the formula:

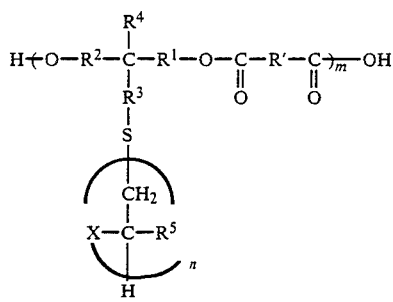

wherein

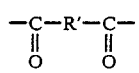

is a residue of a dicarboxylic acid, m is an integer of 1 to 100, and $R^1$, $R^3$, $R^4$, $R^5$, X, and n are as defined above.

Besides, in case of the polymerization of the macromonomer [I] wherein R is OH and a diisocyanate, there is produced a comb-shaped polymer of the formula:

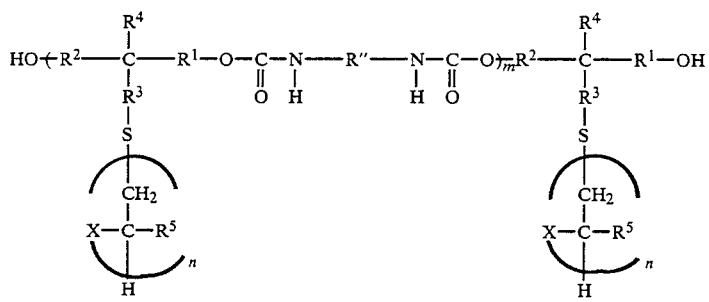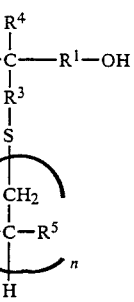

wherein

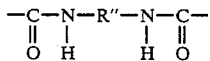

is a residue of a diisocyanate, m is an integer of 1 to 100, and $R^1$, $R^3$, $R^4$, $R^5$, X, and n are as defined above.

The present invention is illustrated by the following examples but should not be construed to be limited thereto.

EXAMPLE 1

Butyl acrylate (100 g), thiomalic acid (1.5 g) and n-propyl alcohol (3 g) are added to a flask and subjected to light-polymerization reaction at about 50° C. with stirring under nitrogen. After about 8 hours, there is obtained a polycondensable macromonomer in a yield of 96% which is measured by weight change (at 105° C., for 4 hours). The product has a number average molecular weight of $2.8 \times 10^4$ which is measured by gel permeation chrompatography (abbreviated as "GPC").

EXAMPLE 2

Methyl methacrylate (100 g), thiomalic acid (1.5 g), toluene (20 g) and n-propyl alcohol (1 g) are added to a flask and subjected to light-polymerization reaction at about 50° C. with stirring under nitrogen. After about 6 hours, there is obtained a polycondensable macromonomer. When measured in the same manner as described in Example 1, the yield of the product is 56%, and the product has a number average molecular weight of $2.3 \times 10^4$.

EXAMPLE 3

Butyl acrylate (9.5 g), 2-hydroxyethyl methacrylate (0.5 g) and thiomalic acid (0.15 g) are added to a glass-made polymerization tube, which is cooled and deaerated and then melt-sealed. The polymerization tube is dipped in a water bath at about 50° C. and the mixture is subjected to light-polymerization reaction by UV irradiation. After about 7 hours, the reaction mixture is taken out from the tube to give a polycondensable macromonomer. When measured in the same manner as described in Example 1, the yield of the product is 88%, and the product has a number average molecular weight of $1.2 \times 10^4$.

EXAMPLE 4

Butyl acrylate (100 g) and 3-mercapto-1,2-propanediol (thioglycerol) (1 g) are added to a flask and subjected to light-polymerization reaction at about 50° C. with stirring under nitrogen by iradition of UV (Toshiba SHL-100, manufactured by Toshiba Corporation, Japan). After about 6 hours, there is obtained a polycondensable macromonomer in a yield of 100% which is measured by weight change (at 105° C., for 4 hours). The product has a number average molecular weight of $1.1 \times 10^4$ which is measured by gel permeation chrompatography (GPC).

EXAMPLE 5

Methyl methacrylate (100 g) and thioglycerol (1 g) are added to a flask and subjected to light-polymerization reaction at about 50° C. with stirring under nitrogen. After about 18 hours, there is obtained a polycondensable macromonomer. When measured in the same manner as described in Example 4, the yield of the product is 96%, and the product has a number average molecular weight of $2.1 \times 10^4$.

EXAMPLE 6

Butyl acrylate (9.5 g), 2-hydroxyethyl methacrylate (0.5 g) and thioglycerol (0.1 g) are added to a glass-made polymerization tube, which is cooled and deaerated and then melt-sealed. The polymerization tube is dipped in a water bath at about 50° C. and the mixture is subjected to light-polymerization reaction by UV irradiation. After about 7 hours, the reaction mixture is taken out from the tube to give a polycondensable macromonomer. When measured in the same manner as described in Example 4, the yield of the product is 98%, and the product has a number average molecular weight of $1.6 \times 10^4$.

EXAMPLE 7

Methyl methacrylate (9.5 g), 2-hydroxyethyl methacrylate (0.5 g) and thioglycerol (0.1 g) are added to a polymerization tube, which is deaerated and sealed. The mixture is subjected to light-polymerization reaction by UV irradiation at about 50° C. After about 12 hours, the reaction mixture is taken out from the tube to give a polycondensable macromonomer. When measured in the same manner as described in Example 4, the yield of the product is 52%, and the product has a number average molecular weight of $1.8 \times 10^4$.

What is claimed is:

1. A polycondensable macromonomer of the formula:

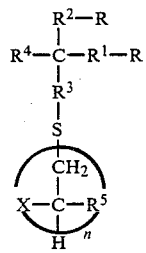

wherein R is OH or COOH, $R^1$, $R^2$ and $R^3$ are each a single bond, or $R^1$, $R^2$ and $R^3$ are the same or different and are each an alkylene having 1 to 4 carbon atoms, $R^4$ is hydrogen atom or an alkyl having 1 to 4 carbon atoms, $R^5$ is hydrogen atom or methyl, X is an alkyloxycarbonyl having 2 to 15 carbon atoms, a cycloalkyloxycarbonyl having 3 to 7 carbon atoms in the cycloalkyl moiety, or phenyl, and n is an integer of from 1 to $1 \times 10^4$.

2. The macromonomer according to claim 1, wherein R is COOH.

3. The macromonomer according to claim 1, wherein R is OH.

4. A process for producing the macromonomer [I] as set forth in claim 1, which comprises polymerizing a mercapto compound of the formula:

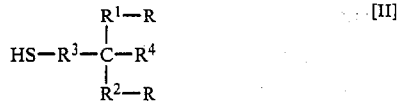

wherein R, $R^1$, $R^2$, $R^3$ and $R^4$ are the same as defined in claim 1 with a vinyl monomer of the formula:

wherein $R^5$ and X are as defined in claim 1 with light irradiation.

5. The process according to claim 4, wherein the mercapto compound [II] is polymerized in an amount of 0.01 to 10 parts by weight to 100 parts by weight of the vinyl monomer [III].

* * * * *